June 27, 1944. F. W. YOUNG 2,352,303
FILTER
Original Filed Sept. 30, 1938 4 Sheets-Sheet 1

INVENTOR
FRANK W. YOUNG
BY
Orton and Griswold
ATTORNEYS

June 27, 1944.   F. W. YOUNG   2,352,303
FILTER
Original Filed Sept. 30, 1938   4 Sheets-Sheet 2

INVENTOR
FRANK W. YOUNG
BY
Orton and Griswold
ATTORNEYS

June 27, 1944.　　　　F. W. YOUNG　　　　2,352,303
FILTER
Original Filed Sept. 30, 1938　　4 Sheets-Sheet 4

INVENTOR
FRANK W. YOUNG
BY
Orton and Griswold
ATTORNEYS

Patented June 27, 1944

2,352,303

UNITED STATES PATENT OFFICE 2,352,303

FILTER

Frank W. Young, Upper Montclair, N. J.

Continuation of application Serial No. 232,509, September 30, 1938. This application August 19, 1939, Serial No. 291,083

22 Claims. (Cl. 210—199)

This invention relates to continuous filters of the kind in which a partially submerged filter drum rotates in a tank of liquid to be filtered and filtrate is drawn through a filtering medium on the peripheral surface to build up a deposit of solid particles as a cake thereon. This application is a continuation of my copending application Serial No. 232,509 filed September 30, 1938, for Filter.

More particularly, the invention relates to filters of the kind in which the drum shell is provided with filtrate passages in communicating relation with an area of the filtering medium and with the drum interior and wherein all parts of the drum interior including the filtrate passages are simultaneously subjected to sub-atmospheric pressure.

As the filter drum rotates in the tank, the flow of the liquids in the tank in which it rotates to and through the filtering medium into the interior of the drum causes a migration of the solids suspended in the liquid to the filtering medium where the material thus filtered out builds up as a deposit of filter cake on the surface of the drum. This deposit remains on the surface of the drum as a drum area emerges from the liquid in the tank during rotation of the drum and until the filter cake arrives at the point at which the cake is removed from the drum. The continuous layer of filter cake on the exposed surface of the drum from the point of immergence to the point of cake discharge effectively seals the interior of the drum against the admission of the atmosphere surrounding the drum, whereby sub-atmospheric pressure is maintained in the drum interior. From the point of cake discharge to the level of the liquid in the tank, however, the filter medium is exposed to atmosphere which, unless its entrance into the drum is prevented, would, in entering the drum, raise the sub-atmospheric pressure in the drum to that of the surrounding atmosphere and thus render filtration impossible. It has heretofore been proposed to seal this exposed area of the filtering surface, but such sealing has been ineffective in every proposal with respect to filter drums, all parts of the interior of which have been simultaneously subjected to sub-atmospheric pressure, and it has been found impossible to completely discharge the filter cake and maintain sub-atmospheric pressure in such filters.

One object of the present invention is to effectively prevent a reduction in the pressure differential between the interior and the exterior of a filter of the kind in which all parts of the drum interior is subjected to sub-atmospheric pressure except that area of the periphery from which filter cake has been removed. Accordingly, a predetermined portion of the interior surface of the drum periphery extending from a point ahead of the point of cake discharge to a point below the level of liquid in the tank and also below the level of liquid in the drum, is shielded. In carrying this aspect of the invention into effect, the filtrate outlet means determine the level of the liquid in the drum to submerge the lower portion of stationary shielding means.

It has also, heretofore, been proposed to effect the discharge of filtered material on the surface of a filter drum by blowing fluid, either liquid or gaseous outwardly through filtrate passages in the filter drum periphery, at a predetermined area of the surface thereof, to separate the cake from the filtering medium for ready removal as by a doctor blade or the equivalent.

To this end, the stationary shielding means of this invention may be provided with a passage adapted to register with at least one filtrate passage in the drum periphery to which fluid under pressure is conducted for effecting this releasing of the cake from the filtering medium.

It is also an object of the invention to provide filter structure which avoids the necessity of precision manufacture and the use of mechanical seals in shielding the drum interior from the admission of the surrounding atmosphere. In accordance with this aspect of the invention, the stationary means is so disposed with respect to the drum interior that there is clearance between the proximate surfaces of the respective shielding means and the surface portion of the shell of the drum formed with filtrate passages, wherein liquid may enter and form a seal.

A further object of the invention is to provide filtrate passages of large volumetric capacity between the filtering medium and the drum interior; to provide such filtrate passages to register with the passage delivering cake discharge fluid and to provide filtrate passages readily shielded at their inner ends. Accordingly, the shell of the drum is formed of slats preferably extending between the drum heads and lying in radial planes.

When the stationary shielding means of this invention takes the form of a so-called blow-back box, liquid collecting in the interior thereof will reduce its volumetric capacity and reduce its value as an expansion chamber for the blow-back fluid. It is, therefore, still another object of the invention to drain the liquid so collected out of the expansion chamber and evacuate it to the exterior of the drum.

Fluid, either liquid or gaseous, has heretofore been directed to a surface of the drum shell beneath the filtered material for discharging the same. It is also an object of the present invention to utilize the gaseous medium withdrawn from the filter drum in producing vacuum therein to discharge the filter cake from the drum. Accordingly, a barometric leg empties into a closed tank and the gaseous medium drawn from the drum interior through the barometric leg collects in the closed tank above the liquid in the tank, which is maintained at a predetermined level therein, and this gaseous medium so collected is utilized as the blow-back fluid.

Another object of the invention is a continuous filter wherein the rotating filter drum is firmly supported for rotation. Accordingly, the filter drum is carried with and rotates upon an axially extending cylindrical bearing.

It is also an object of the invention to facilitate the removal of filtrate from the interior of the drum. To this end, the cylindrical bearing is formed with filtrate passages affording rapid evacuation of the filtrate from the interior of the drum into the cylindrical bearing, which is in communicating connection with a region of subatmospheric pressure. More particularly, the invention relates to a continuous filter wherein maximum rigidity and support is provided for the filter drum. Accordingly, the filter drum, which is concentric with an axially extending cylindrical bearing, is provided with companion cylindrical bearing members extending outwardly, respectively, upon opposite sides thereof, and the joint between the cylindrical bearing and the bearing member is suitably sealed to prevent the escape of the liquid and the ingress of air. The cylindrical companion bearing members are ideally adapted as a driving connection for the filter drum in rotating the same and in one aspect of the invention, gear means may be fixed thereon to be driven from any convenient source of power.

The invention also has for an object, improved supporting means for the instrumentalities delivering air or other fluid medium under pressure to one or more predetermined filtrate passages in the periphery of the drum for the purpose of removing filter cake from the filter medium thereon. In accordance with this aspect of the invention, a shoe, formed with a cylindrical surface, preferably closely proximate the interior surface of the drum, is formed with a passage adapted to register with a filtrate passage in the drum periphery. Such blow-back is conveniently supported from the cylindrical bearing member and is in communicating connection with a conduit entering the interior of the filter drum through a filtrate or other passage in the cylindrical bearing member. It is another object of the invention to maintain the shoe in proper shielding relation to the interior of the drum surface. To this end, the shoe is mounted upon the cylindrical bearing with provision for adjustment, and the liquid level in the drum is so maintained as to submerge the lower part of the shoe.

A further object of the invention is to effect a series countercurrent washing of the cake formed on the filtering surface during the rotation of the filter drum and prior to its discharge. To this end, one or more collecting pans are disposed within the interior of the drum and simultaneously subjected, together with all parts of the drum interior, to subatmospheric pressure which are adapted to receive filtrate from predetermined filtrate passages in the drum periphery, which collecting pans are, respectively, in communicating relation with conduits conveniently disposed within the cylindrical bearing and communicating with the collecting pans, on the one hand, through filtrate or other passages in the cylindrical bearing and with reservoirs on the other hand by which, if desired, the filtrate so collected as wash water of varying degrees of strength may be returned to the filter for delivery to predetermined preceding areas of the surface of the filter cake thereon.

It has heretofore been proposed to provide filters with trunnions rotating on a bearing pipe and wherein packing was provided to prevent atmosphere entering the drum. Such constructions were ineffective, however, because the relatively movable surfaces were subject to wear. The present invention seeks to provide a construction utilizing a bearing ring and provide packing to prevent liquid from the drum reaching the bearing. Also, in accordance with the present invention, the packing is adjusted from without the trunnion.

It has heretofore been proposed to seal the space between the drum trunnions and the opening in the tank through which the trunnions pass by means of an annular flexible strip mounted on the tank and bearing on the cylindrical surface of the trunnion. Such seal, however, required great exactness in the concentricity of the annular strap and the trunnion which was difficult, if not impossible, to attain due to the changes in relative position of the tank and drum when the respective members were filled with liquid. Another object of the present invention is a seal which is effective irrespective of lack of concentricity of the coacting parts. To this end, a flexible strap is secured about a cut-away portion of the tank and its free edge bears upon the head of the drum. Many advantages flow from this construction as will be more apparent hereinafter.

Still another object of the invention is the employment of the simple construction of the cylinder decker principle of the paper industry employing, however, the higher vacuum heretofore exclusively produced in the compartmentized filter.

Yet another object of the invention is to separate and collect the first or cloudy filtrate. To this end a collecting pan or chamber is so disposed within the interior of the drum with its submerged mouth proximate the interior surface to receive first or cloudy filtrate directly from filtrate passages in the drum periphery, at the point of initial filtration.

In situations where there is a tendency for the cloudy filtrate in the cloudy filtrate collecting pans to flow around the edge of the pan into the relatively clean filtrate in the drum interior, it is sought by one aspect of this invention to prevent this contamination of the clearer liquid. Accordingly, a conduit is provided which extends to a low point of the pan to remove the cloudy filtrate from substantially the lowermost point of the pan and, if conditions require, induce a flow of the clearer filtrate around the edge of the pan thereinto, to oppose the flow of cloudy filtrate in the opposite direction.

The invention also seeks a filter which is practical from the standpoint of ease and cheapness of manufacture and practicability and efficiency in use.

These and other objects of the invention and the means for their attainment will be more apparent from the following detailed description, taken in connection with the accompanying drawings illustrating various embodiments by which the invention may be realized and in which.

Figure 4:
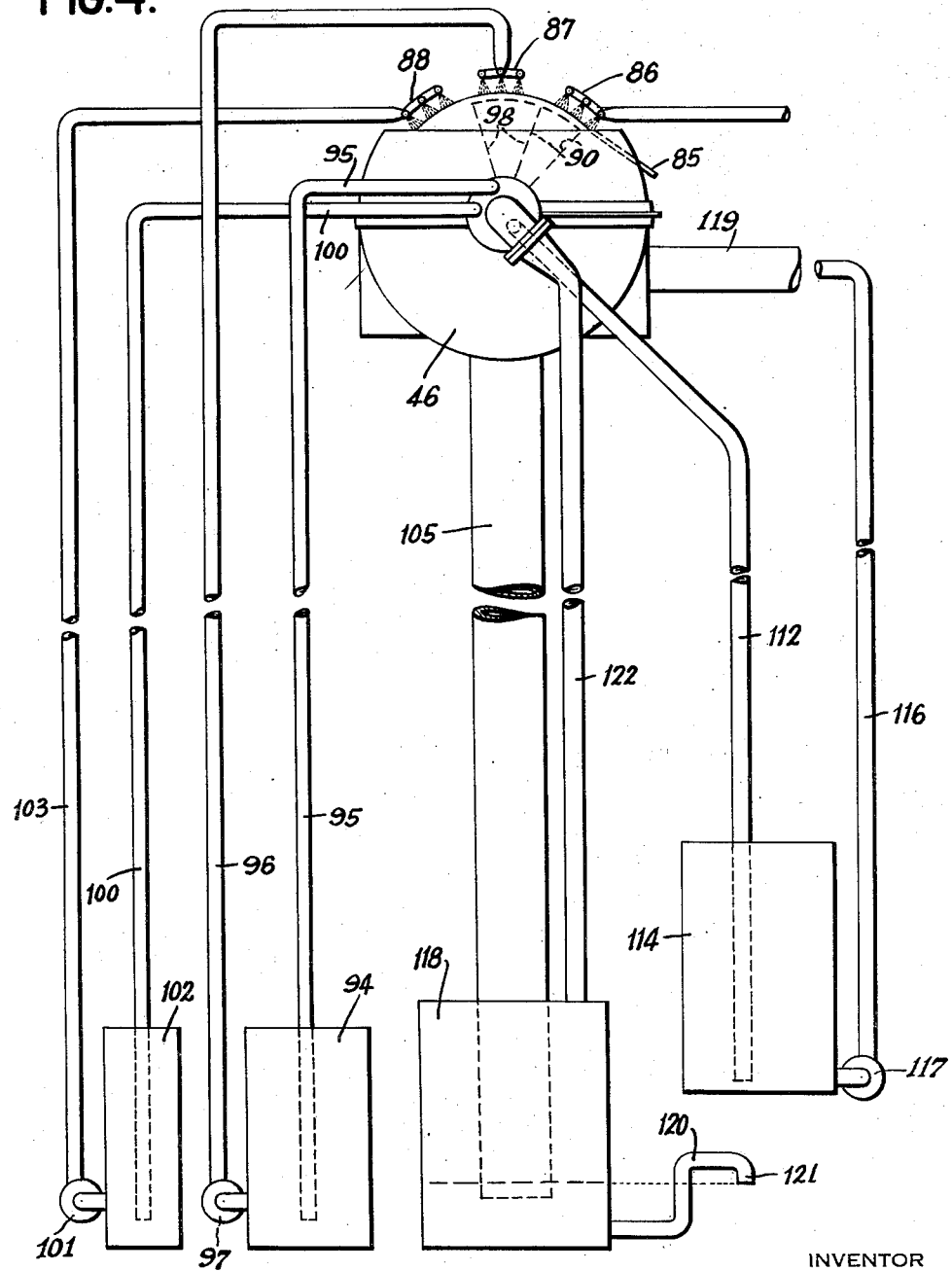
Figure 5:
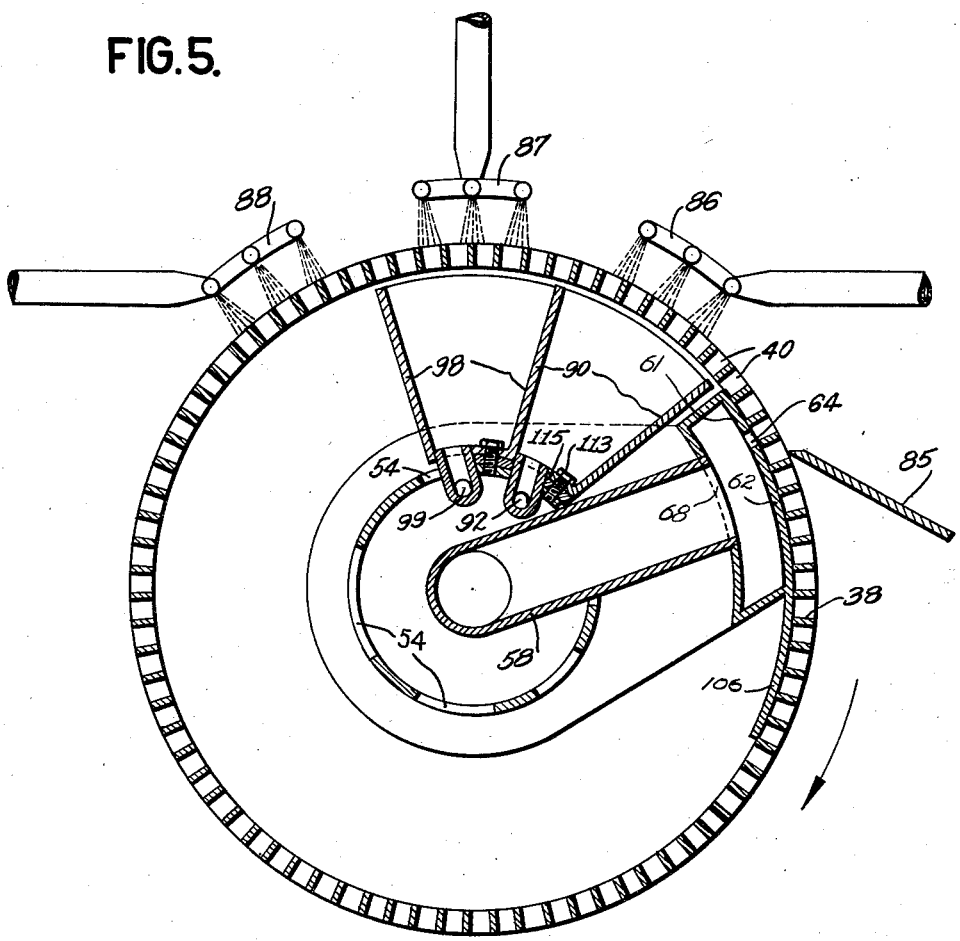

Figure 4 is a somewhat diagrammatic view of the filter of this invention showing closed seal tanks and vacuum producing means and the counter-current washing of the cake; and Figure 5 is a transverse sectional view taken in a vertical plane through the filter drum to show particularly the collecting pans and spray nozzles for the wash liquids in the counter-current washing, as exemplified in Figure 4.

Figure 1:
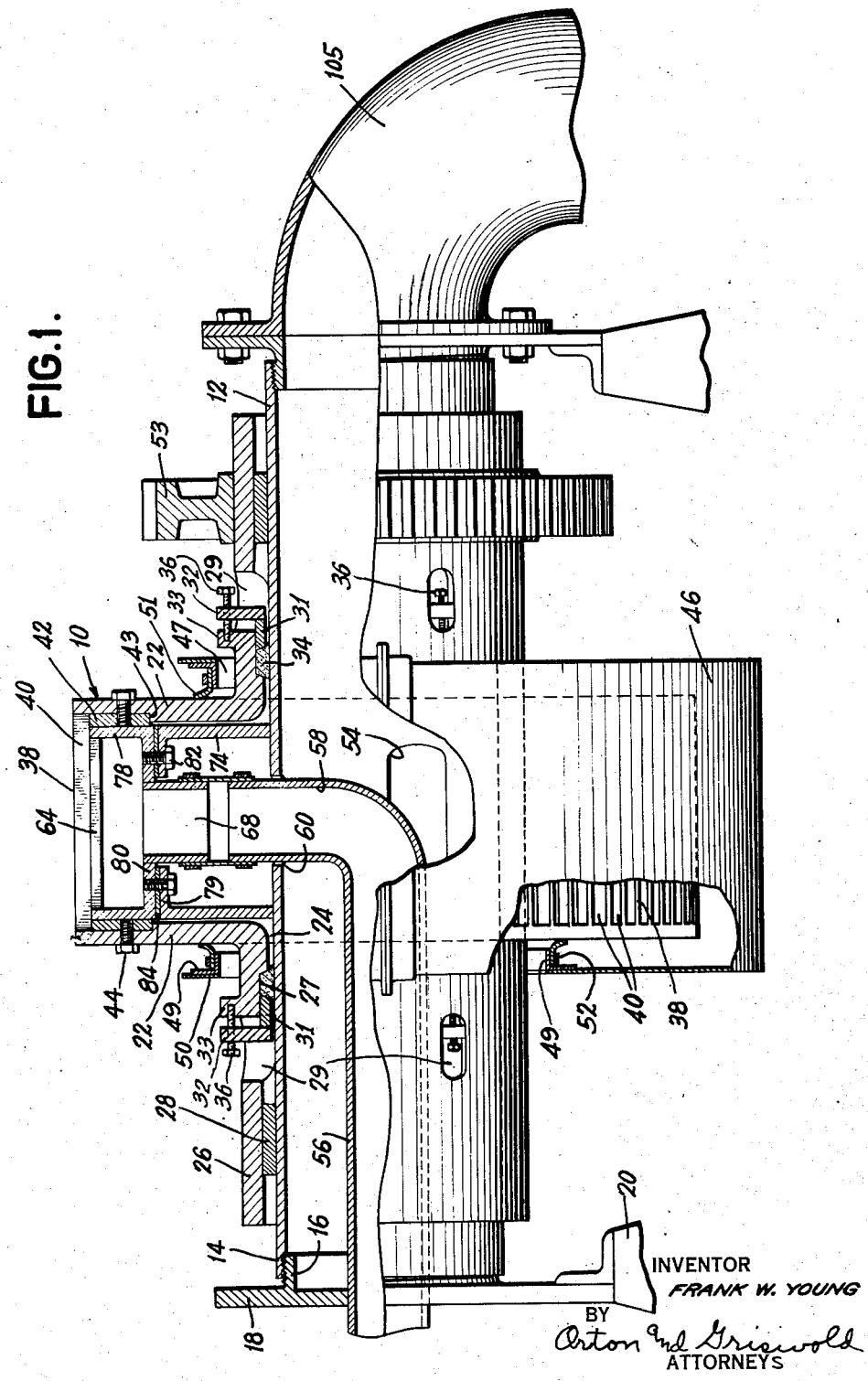
Fig. 1 is a view in front elevation of a continuous filter in accordance with this invention, parts being removed in planes indicated by the broken lines 1—1 of Figure 2 and looking in the direction of the arrows, to show details of construction.

Referring first to Figure 1, the continuous filter of this invention is shown as comprising a filter drum 10 rotatably mounted on and intermediate the ends of an axially extending cylindrical bearing member 12 of a length considerably greater than the width of the filter drum. This cylindrical bearing member 12 is shown as taking the form of a tube secured, at each end, as by threads 14 inwardly thereof, to a threaded collar or thimble 16 carried with a frame member 18 mounted upon suitable foundations 20.

Intermediate the ends of the cylindrical bearing, is disposed the filter drum 10 which, in the illustrated embodiment is shown as formed by a pair of spaced discs 22 centrally apertured, as at 24, to receive the cylindrical bearing 12 in spaced relation thereto. The apertures 24 in the respective side walls 22 of the filter drum are defined by outwardly extending cylindrical flanges or trunnions 26 which are spaced from the cylindrical bearing member 12 by bearing rings 28 interposed therebetween. As shown, each trunnion 26 forms one member of a pair of, what may be termed, stuffing box members. The bearing member 26 is of an increased diameter as at 27 to receive an adjustable composite stuffing box member 31, 32 with the packing 34 between the packing ring 31 and the trunnion surface, pressure on the packing being effected by adjustable take-up screws 36 which pass through apertures in lugs 32, are disposed in the apertures 29 and the ends of which are tapped into a rib 33 on the trunnion 26.

The circumferential surface of the drum is formed by a composite cylindrical member 38—42 which may be composed of more than one part or as an integral cylinder and is formed with a plurality of transversely extending filtrate passages 40 defined by slits 38 extending between annular members 42. The annuli 42 rest upon shoulders 43 formed on the inner surfaces of sides 22 and are bolted thereto, as at 44. Filtering medium, not shown, overlies the surface of the drum and is supported by the slats 38.

The filter drum rotates in the filter tank 46 through which the cylindrical bearing member 12 passes and the filter tank 46 is open to the atmosphere. The opening 47 through which the trunnion 26 passes to the outside of the tank is sealed. In the illustrated embodiment an angle iron 49 is carried with the inner surface of the tank wall 50 and carries an annular flexible strap or band 51, one edge of which is held to the angle iron as by a clamping ring 52.

The free edge of the band 51 bears on the side of the drum with wiping contact and extends toward the side wet by the fluid in the tank so that the pressure of the fluid retains the free edge in sealing contact with the side of the drum, pressing it more tightly as the depth of the liquid in the tank increases. In this way the sealing pressure is always proportional to the pressure of the liquid seeking to escape. This type of seal presents many advantages since the diameter of the aperture 49 can be almost as great as the diameter of the filter drum, thus reducing the tank head to a minimum and enabling ready access to manholes in the head of the drum.

The filter may be rotated in any convenient manner. As shown, a gear 53 encircles and is fixed to one of the trunnions 26, this gear being driven by any suitable train of gears to obtain the speed of rotation desired of the filter.

Inwardly of the filter drum, the cylindrical bearing is formed with a plurality of filtrate passages 54 whereby fluid from the interior of the filter drum may enter the cylindrical bearing for evacuation from the drum. The total area of passages 54 are greater than the internal cross-sectional area of bearing tube 12 so that filtrate from the interior of the drum has unobstructed access to tube 12 in volume up to the carrying capacity of tube 12. During operation, the minimum level of the liquid inside the drum will never be lower than the lowest passage 54 because the liquid flows out by gravity. As is well known, during operation as a vacuum filter, the level of the liquid inside the drum will not be higher than the highest passage 54 because, in order to maintain vacuum in the drum, air must be evacuated through tube 12 and cannot be so evacuated should all outlets be submerged.

It is proposed, in accordance with one aspect of the invention, to remove the filtered material from the surface of the filter drum by a pressure differential upon opposite faces thereof. Specifically, it is proposed to force fluid such as air or water or other fluid medium outwardly through the filtration passages 40, formed in the drum periphery. To this end, a conduit, such as the pipe 56, adapted to conduct air or other fluid medium under pressure, is disposed axially of the cylindrical bearing 12 and an elbow or bent extremity 58 on the end thereof passes through a passage 60 formed at a suitable place in the cylindrical bearing 12 and terminates within the drum interior.

In the illustrated embodiment, a shoe or box receives the fluid medium under pressure from this conduit 56, 58. As shown, the outer wall 62 (Figure 2) of the shoe is provided with an aperture 64 of a size to register with and be preferably coextensive with one of the passages 40 in the drum periphery. The inner box wall 66 opposite the aperture 64 is formed with a tubular passage 68 to receive the fluid from the conduit end 58 to which it may be connected by a yielding or elastic tubular connection 70 preferably of a yielding non-metallic material having some degree of elasticity, such as rubber or impregnated web material. This connection may be secured by clamping rings 72. Conveniently, a pair of spaced side members 74 each formed with a round aperture 75 to receive the cylindrical bearing member 12 are secured in proper position thereon, as by set screws 76 passing through ears 77 on the members 74 and bearing against the bearing pipe 12. The outer ends of the sides 74 and the side walls 78 (Figure 1) of the box are formed with inwardly directed flanges 79 and 80, respectively, which are curved concentric with the internal surface of the drum 10. Stud bolts 82 connect the flanges 78 and 80 to secure the parts together and shims 84 therebetween, insure proper clearance and a relatively close fit between the surface of wall 62 and the inner surface of the drum 10 that is, in the illustrated embodiment, the inner surface of the slats 38. It will be apparent that the box 61—68 may be also adjusted with respect to the drum by the set screws 82. Thus by tightening up on the set screws 82 the shield will be pulled away from the drum interior surface to obtain a desired degree of clearance while by inserting the shims 84 the shield is advanced toward the drum to obtain the proper clearance.

Figure 2:
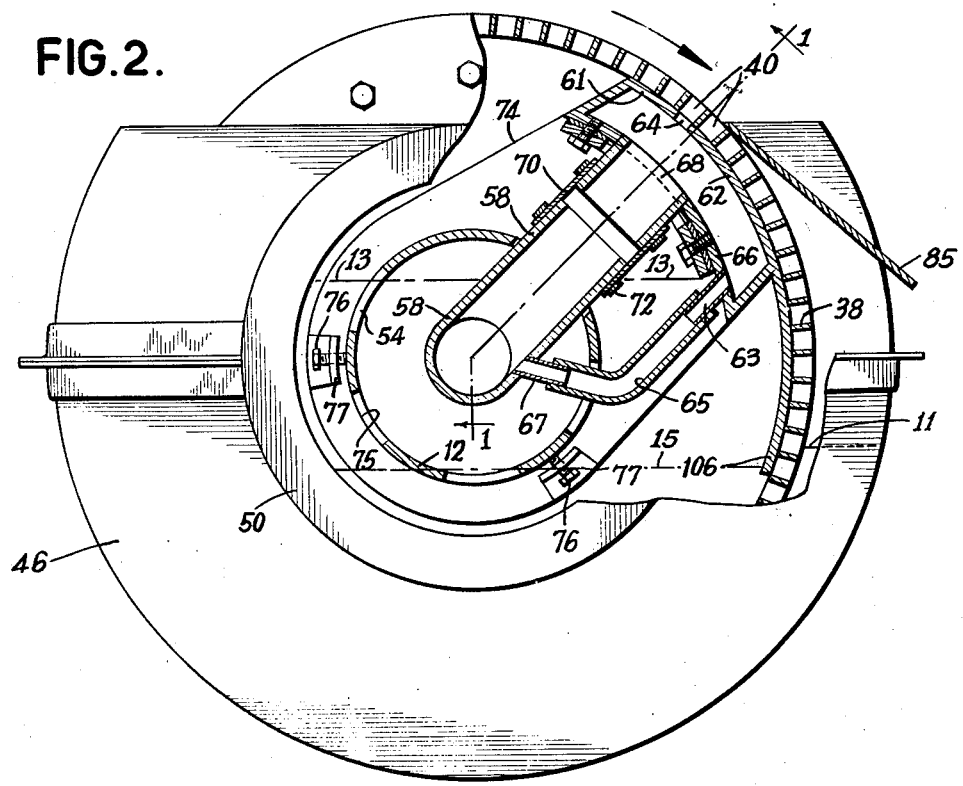
Figure 2 is a view showing the tank in end elevation, looking from the right in Figure 1, parts being broken away to show details of structure in the interior of the filter drum.
Figure 3:
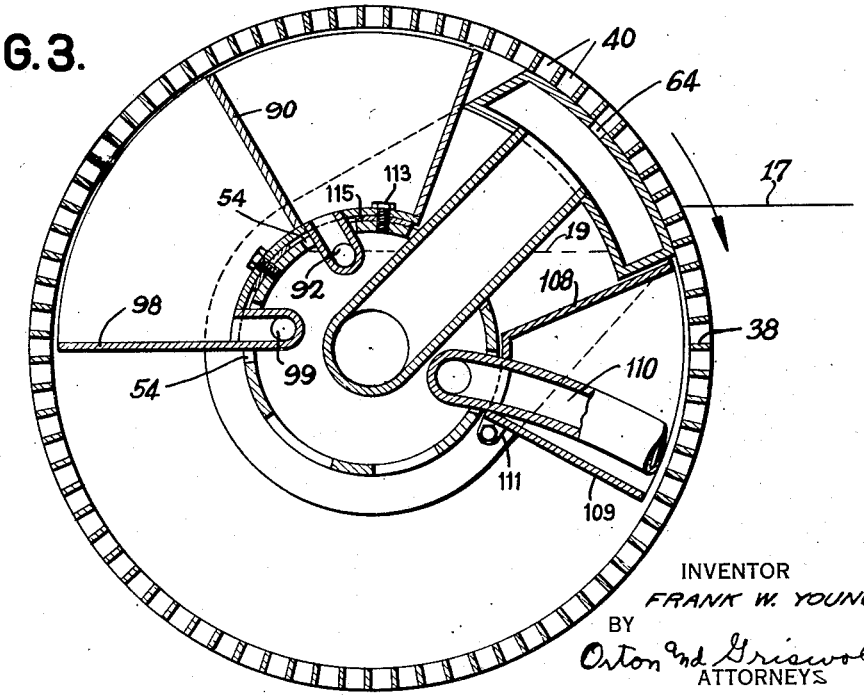
Figure 3 is a transverse sectional view, taken in a vertical plane through a filter drum in accordance with this invention, to show particularly the use of a cloudy liquor collecting pan in the continuous filter of this invention.

The drum shown in Figure 3 is applicable for use in high submergence operation, that is, with the pulp level in the tank above the horizontal axis. If desired, and when the filter is to be operated with less submergence of the drum, the wall 62 of the blow-back box may be continued downwardly as a tail, as shown at 106, in Figure 2, in substantial contact with the interior surface of the drum to a point below the lower pulp level to seal the interior of the drum between the point of cake take-off and the level of the pulp in order to maintain the desired degree of subatmospheric pressure within the drum. Arrows are shown in Figures 2 and 3 to indicate the direction of rotation of the filter drum.

It has also been found that proper operation of the filter of this invention is dependent upon internal submergence of the lower end of the box or shield in the liquid or filtrate in the drum. Figure 2 shows a low submergence filter i. e. the level of the pulp 11 in the tank is below the center line of the filter and the shield 61, 106 extends from ahead of discharge 64 to a point beyond the pulp level 11. The filter described in Figure 2 is designed for high capacity, free filtering material and when operating on such material, the filtrate will approximately fill the tube 12 and the filtrate level in the drum will be at 13. This filter may also be used for low capacity, slow filtering material and when operating on such material, the filtrate may only trickle out of tube 12 and the filtrate level in the drum will be at 15. In either case the lower part of the shield 61, 106 is submerged in the filtrate 13 or 15.

Figure 3 shows a high submergence filter i. e. the level of the pulp 17 in the tank is above the center line of the filter and the shield extends from ahead of discharge 64 to a point beyond the pulp level 17. The filter described in Figure 3 is designed for high capacity, free filtering material and when operating on such material, the filtrate will approximately fill the tube 12 and the filtrate level in the drum will be at 19, in which case the lower part of the shield or blow-back box is submerged in the filtrate 19.

As the drum rotates, filter cake on the surface thereof is lifted off the surface by the pressure of the fluid passing through the apertures 64 and 40 so that it is separated from the filtering medium on the drum and carried away by the doctor blade 85.

When using air or gaseous medium as the discharge fluid, it is found of advantage to have a reservoir or expansion chamber such as is used with a compressor or pump. The volumetric capacity of box 61—68 is therefore of advantage. In some operations, filtrate from the partially dewatered filter cake will be found to fall into this box through the opening 64, and the accumulation of liquid therein materially reduces the volumetric capacity of the box. It is therefore preferred to provide an outlet 63 (Figure 2) which is connected by a tube 65 to a nipple 67 in pipe 58 so that liquid instead of accumulating in box 61—68 will drain back into pipe 58 and therefrom downwardly to the supply.

If it is desired to wash the filter cake, nozzles 86, 87, 88 (Figure 4) may be mounted, in known manner, in spaced relation to the filter medium on the filter drum 10. The wash liquid falling, say, from a nozzle 86 ahead of the point where the cake leaves the drum, passes through the filter cake on that segment of the drum periphery and enters a pan 90 mounted therebeneath. An outlet 92 from the pan 90 passes through one of the filtrate passages 54 in the wall of the cylindrical bearing member 12 and from thence is conducted to a receiving tank 94 as by pipe 95 (Figure 4). The weak wash liquor from tank 94 may then be pumped as by pump 97 through pipe 96 to nozzles 87 and pass through the filter cake into pan 98 from whence it is lead through outlet 99 and pipe 100 into tank 102 from which the stronger wash liquor may be pumped as by pump 101 through pipe 103 to nozzles 88. The wash liquor from nozzles 88 passes through the filter cake at about the point where the cake emerges from the slurry and into the interior of the drum where it mixes with the filtrate and is evacuated by pipe 12. This description is of a three stage countercurrent washing and to those versed in the art is known to be regularly accomplished by using three filters. Due to the novel construction of this filter, unlimited stages of countercurrent washing may be accomplished on a single filter. Of course, the capability of this filter for single stage or multi-stage washing are self-evident. The pans may be supported in any manner from the pipe 12 or on their respective evacuating pipes. Obviously, as many or as few pans, or none, may be used as desired for the purpose at hand.

When the object of the filtration operation is primarily to obtain clear filtrate, such as a save-all for a paper machine, it is advantageous to separately collect the first filtrate of the filtration cycle and return it to the pulp in the filter tank for a second filtration. For the collection of this first, or cloudy filtrate, a pan or compartment 108 (Figure 3) is placed in the filter drum 10 in the zone of initial filtration and adjacent to the shoe box 62—68 or tail 106 so that the first filtrate enters this compartment and is drawn out through the tube 110 and down a barometric leg 112 (Figure 4) into seal tank 114 from which it is pumped back as by pump 117 into the filter feed 119 or filter tank 46 through pipe 116.

In order to avoid taking clear filtrate into the pan 108 from a point in the filtration cycle subsequent to that at which cloudy filtrate is obtained, means may be provided to selectively cut off the filtrate flowing into the pan 108 at the point in the drum periphery where sufficient filter cake has built up to pass only clear filtrate. In the illustrated embodiment, the wall 109 of pan 108 is shown as hinged, as at 111, to permit its adjustment to the desired point of separation and held at that point by any suitable means. In this event, it may be desirable to form the end of conduit 110 of flexible material so that its end will follow wall 109 and be always in the lowest portion of the pan to insure the removal of cloudy filtrate and prevent its escape into the clear filtrate.

In every instance, of course, tube 110 will extend to the lowest part of pan 108 to insure evacuation of the cloudy filtrate.

The pans 90, 98 and 108 are preferably carried by the tube 12 and may be conveniently secured thereto as by bolts 113 and the pans are supported in adjusted relation to the surface of the filter drum as by the shims 115.

In the illustrated embodiment, the subatmospheric pressure in the filter drum is created through the instrumentality of a barometric leg 105, although, of course, a pump could be used instead.

Since the blow back on box 62—68 is fixed on the pipe 12, the slot 64 may be set to any desired point of blow off and the box wall portion 61 to any desired point of cut-off by rocking or turning the pipe 12 through the desired angle, the pipe being free to turn by reason of the threaded ends 14.

Where a barometric leg is used, as at 105, in Figure 4 for producing the vacuum, air drawn through the filter medium is carried down with the liquid in the barometric leg and into the closed tank 118, where the air and liquid separate, the liquid flowing out of the closed tank 118 through the pipe 120 which traps the air under pressure in the closed tank 118 and controls the volume of air according to the height of the outlet 121.

The air is accumulated in the upper part of tank 118 at the pressure produced therein and is allowed free flow through pipe lines 122 into the blow-back pipe 56 leading to the air box 61—68. Thus the volume of air and the pressure thereof produced in the closed tank 118 can be utilized in the air box 61—68 to discharge the filter cake.

Where a pump is used to create or augment the subatmospheric pressure in the filter drum, the discharge thereof may be connected to pipe 122 to provide the blow-back air.

The filter of this invention has been found to have a high volumetric capacity with a relatively small filtering surface as compared with existing filters and to have many flexible features, such as the accurate separation of wash liquors, cloudy filtrates, etc., which separations have been attempted, but only approached, heretofore. Also the filter per se, adapts itself to such complete separation of liquid and gas that filtrates separating tanks, pipes, etc., are unnecessary. The ability of this filter to separate various solids from liquids does not have the close limitations of filtration for difficult filtering materials, that is, those that give a very thin filter cake in a comparatively long filtering time, because of the perfect discharge of the filter cake and perfect cleaning of the filtering medium by means of the complete and broad blow-back, resulting from the use of a large volume of discharge fluid at relatively low pressure created by the blow-back box of large volumetric capacity while the blow-back outlet 64 is equal in area to the filter medium registering with a full or complete space 40.

Various modifications will occur to those skilled in the art in the composition, configuration and disposition of the component elements going to make up the invention as a whole as well as in the use of selected elements in given situations and no limitation is intended by the phraseology of the foregoing description or illustrations in the accompanying drawings except as indicated in the appended claims.

What is claimed is:

1. A continuous filter comprising a transverse hollow cylindrical bearing, a filter drum concentric therewith and rotatable thereupon, a tank within which said drum is partially submerged, filtrate passages formed in the drum periphery, filtrate passages formed in the cylindrical bearing within the drum through which liquid passes from the drum interior to the interior of the hollow bearing, a shoe within the drum adapted to seal predetermined passages in the drum periphery, said shoe being formed with a passage adapted to register with at least one drum passage and formed with a fluid inlet passage, a conduit for fluid medium within the cylindrical bearing and extending into the interior of the drum and means supporting said shoe with the fluid inlet passage in communicating relation with said conduit whereby fluid medium from the conduit enters the shoe, said supporting means comprising a plurality of members formed with apertures, respectively, receiving the cylindrical bearing and supporting the shoe at their other ends and means to secure the said members to the cylindrical bearing.

2. A continuous filter comprising a transverse cylindrical bearing, a filter drum concentric therewith and rotatable thereupon, a tank within which said drum is at least partially submerged, filtrate passages formed in the drum periphery, filtrate passages formed in the cylindrical bearing within the drum, a box-like shoe within the drum adapted to seal predetermined passages in the drum periphery and formed with a passage adapted to register with a drum passage and with a fluid inlet passage, conduit means within the cylindrical bearing and extending into the interior of the drum, means supporting said shoe with its inlet passage in communicating relation with said conduit means comprising apertured side members carried by the bearing and formed with flanges and means to secure the box-like shoe to the flanges with provision for adjustment toward and away from the drum periphery to support said shoe in predetermined spaced relation to the interior surface of the drum.

3. A filter comprising a rotatable drum comprising spaced heads, filtering medium covering the entire drum periphery between the heads, apertures formed in the drum periphery in substantially every portion thereof between the heads and beneath substantially the entire area of the filtering medium to receive the filtrate directly from the filtering medium and deliver it directly into the drum interior whereby the path of flow of all the filtrate is substantially radially directly into the drum interior, a tank within which the drum is partially submerged in liquid to be filtered, means to discharge filter cake from the drum, stationary means in the drum to shield all the filtrate passages in a predetermined arcuate area extending from one drum head to the other, said stationary means extending from a point ahead of the point of cake discharge to a point below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge sufficient of the lower part of the stationary means to prevent atmospheric leakage into the drum interior.

4. A filter comprising a rotatable drum comprising spaced heads, filtering medium covering the entire drum periphery between the heads, apertures formed in the drum periphery in substantially every portion thereof between the heads and beneath substantially the entire area of the filtering medium to receive the filtrate directly from the filtering medium and deliver it directly into the drum interior whereby the path of flow of all the filtrate is substantially radially directly into the drum interior, a tank within which the drum is partially submerged in liquid to be filtered, means to discharge filter cake from the drum, stationary means disposed in the drum with clearance therebetween to shield all the filtrate passages in a predetermined arcuate area extending from one drum head to the other, said stationary means extending from a point ahead of the point of cake discharge to a point below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge sufficient of the lower part of the stationary means whereby liquid in the clearance is maintained to prevent atmospheric leakage into the drum interior.

5. A filter comprising a rotatable drum formed with filtrate apertures in its periphery, a tank within which the drum is partially submerged in liquid to be filtered, stationary means in the drum to shield predetermined filtrate passages, said stationary means being formed with an aperture adapted to register with at least one drum aperture and means to conduct fluid under pressure to and through the apertures to discharge the filtered material on the surface of the drum, said stationary means extending from a point ahead of the point of cake discharge to a point below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means.

6. A filter comprising a rotatable drum, a tank within which the drum is partially submerged in liquid to be filtered, the peripheral surface of said drum comprising slats disposed in radial planes to define filtrate passages, means to discharge filter cake from the drum, stationary means in the drum to shield predetermined filtrate passages, said stationary means being formed with a passage adapted to register with at least one filtrate passage, and means to conduct fluid under pressure to and through the apertures to discharge the filter cake on the surface of the drum, said stationary means extending from a point ahead of the point of cake discharge to a point below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means.

7. A filter comprising a rotatable drum formed with filtrate passages in its periphery, a tank within which the drum is partially submerged in liquid to be filtered, stationary means in the drum to shield predetermined filtrate passages, said stationary means comprising a closed chamber having a wall in close proximity to the interior surface of the drum periphery and substantially concentric with said surface, said wall being formed with a passage to register with at least one filtrate passage in the drum periphery and means to conduct fluid under pressure to the closed chamber and through the registering passages to the filtered material on the periphery of the drum at the passage to discharge the filtered material from the drum, said stationary means extending from a point ahead of the point of the discharge of the filtered material to a point below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means.

8. A filter comprising a rotatable drum formed with filtrate passages in its periphery, a tank within which the drum is partially submerged in liquid to be filtered, stationary means in the drum to shield predetermined filtrate passages, said stationary means comprising a closed chamber having a wall in close proximity to the interior surface of the drum periphery, and substantially concentric with said surface, said wall being formed with a passage to register with at least one filtrate passage in the drum periphery and means to conduct fluid under pressure to the closed member and through the registering passages to the filtered material on the periphery of the drum at the passage to discharge the filtered material from the drum and a communicating draining connection between a low point of the closed chamber and the fluid conducting means, said stationary means extending from a point ahead of the point of discharge of the filtered material to a point below the level of the liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means.

9. A filter comprising a rotatable drum formed with filtrate passages in its shell, a tank within which said drum rotates and is partially submerged, means to create subatmospheric pressure within the drum comprising a barometric leg conducting liquid and gaseous medium from the drum interior, a closed tank into which the barometric leg empties, liquid outlet means to maintain a predetermined liquid level in the closed tank whereby gaseous medium collects thereabove and a conduit to conduct the gaseous medium from the closed tank and direct it to a surface of the drum shell beneath the filtered material for discharging the filtered material.

10. A filter comprising a rotatable drum formed with filtrate passages in its periphery, a tank within which the drum is partially submerged in liquid to be filtered, a pan within the drum, means to support the pan with its open mouth proximate a predetermined area of the interior surface of the drum in a zone of washing, means to discharge filter cake from the drum, stationary means in the drum to shield predetermined filtrate passages, said stationary means extending from a point ahead of the point of cake discharge to a point below the level of liquid in the tank, means to simultaneously subject all parts of the drum interior including the pan to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means, means to deliver wash liquid to said predetermined area of the drum surface proximate the open mouth of the pan and means to evacuate the liquid in the pan to the exterior of the drum.

11. A filter comprising a rotatable drum formed with filtrate passages in its periphery, a tank within which the drum is partially submerged in liquid to be filtered, a pan within the drum, means to support the pan with its open mouth proximate a predetermined area of the interior surface of the drum in a zone of washing, means to discharge filter cake from the drum, stationary means in the drum to shield predetermined filtrate passages, said stationary means extending from a point ahead of the point of cake discharge to a point below the level of liquid in the tank, means to simultaneously subject all parts of the drum interior including the pan to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means, means to deliver wash liquid to said predetermined area of the drum surface proximate the open mouth of the pan, means to evacuate the liquid in the pan to the exterior of the drum and means to deliver the spent wash liquid from the pan to a preceding predetermined area of the drum surface.

12. Sealing means particularly adapted for a continuous filter comprising a tank formed with a cut away wall portion, a filter drum rotatable in the tank and comprising a head having a portion extending through the cut away portion of the tank wall, sealing means between the filter drum and the tank comprising a flexible strip one side edge of which is fixedly carried in sealing engagement with the tank about the cut away portion, the other free edge of said strip bearing on the plane surface of the head of the drum with the free edge of the strip extending toward the periphery of the drum whereby the pressure of the liquid in the tank against the strip retains the free edge in sealing contact with the head of the drum.

13. In a filter, a rotatable drum comprising a pair of spaced heads, filtering medium covering the entire drum periphery between the heads, a peripheral surface directly beneath and supporting the filtering medium over substantially its entire surface and from one head to the other and formed with filtrate apertures substantially in every portion thereof between the heads and directly receiving filtrate from the filtering medium and delivering the filtrate so that the path of flow of all the filtrate is substantially radially directly into the interior of the drum in every portion thereof between the heads, a tank within which the drum is partially submerged in the liquid to be filtered, means to discharge filter cake from the drum, stationary means in the drum extending continuously between the heads and shielding the filter medium in the axial direction of the drum over its entire surface between the heads and in a circumferential direction extending from a point ahead of the point of cake discharge to a point below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means.

14. In a filter, a rotatable drum comprising a pair of spaced heads, filtering medium covering the entire drum periphery, a peripheral shell extending between the heads and directly beneath and supporting the filtering medium over substantially its entire surface and formed with filtrate apertures substantially in every portion thereof between the heads and directly receiving substantially all of the filtrate from the filtering medium and delivering all of the filtrate so that the path of flow of all the filtrate is substantially radially directly into the interior of the drum in every portion thereof between the heads, a tank within which the drum is partially submerged in the liquid to be filtered, means to discharge filter cake from the drum, stationary means in the drum extending continuously between the heads and shielding the filter medium over its entire surface between the heads and extending in a circumferential direction from a line ahead of the point of cake discharge to a line below the level of liquid in the tank, means to simultaneously subject all parts of the drum interior to subatmospheric pressure except that shielded by the stationary means and filtrate outlet means whereof the level of the bottom thereof is disposed at a predetermined elevation above the level of the lower edge of the shield to maintain a predetermined level of the filtrate within the drum to submerge the lower part of the stationary means.

15. A continuous filter comprising a tank, a cylindrical bearing, a filter drum concentric therewith, trunnions to carry said drum and rotatable upon said cylindrical bearing, the internal diameter of the trunnions being greater than the external diameter of the bearing, the internal surface of the extremity of the respective trunnions being each of increased diameter to receive a bearing ring, a bearing ring between each trunnion and the cylindrical bearing, an inner surface of each trunnion being formed with an annular recess to receive packing, packing rings in the respective recesses, a passage in the respective trunnions communicating with the annular recesses, respectively, means in the respective passages to advance the respective packing rings to effect a sealed joint between the respective trunnions and the cylindrical bearing and prevent liquid from the drum reaching the bearing rings, and comprising means extending through the respective passages and outwardly of the trunnions for adjusting the respective packing rings from the outside of the drum.

16. A filter comprising a rotatable drum adapted to be at least partially submerged in liquid to be filtered, filtrate passages formed in the drum periphery, a pan within the drum, said pan having an open mouth, means to support the pan with its open mouth in substantial sealing contact with and proximate a predetermined area of the interior surface of the drum in the zone of initial filtration to separately collect the first or cloudy filtrate directly therefrom, filtrate outlet means disposed at a predetermined elevation above the level of the open mouth of the pan to maintain a predetermined level of filtrate in the drum submerging the said mouth of the pan, means to simultaneously subject all parts of the drum interior including the pan to subatmospheric pressure and conduit means leading from the pan to the exterior of the drum to evacuate the filtrate in the pan.

17. A filter comprising a rotatable drum adapted to be at least partially submerged in liquid to be filtered, filtrate passages formed in the drum periphery, a pan within the drum, said pan having an open mouth, means to support the pan with its open mouth in substantial sealing contact with and proximate a predetermined area of the interior surface of the drum in the zone of initial filtration to separately collect the first or cloudy filtrate directly therefrom, filtrate outlet means disposed at a predetermined elevation above the level of the open mouth of the pan to maintain a predetermined level of filtrate in the drum submerging the said mouth of the pan, means to simultaneously subject all parts of the drum interior including the pan to subatmospheric pressure and conduit means having an open end disposed at a low point in the mouth of the pan whereby to remove substantially all filtrate from said pan.

18. A filter comprising a rotatable drum formed with filtrate passages in its periphery, a tank within which the drum is partially submerged in liquid to be filtered, a pan within the drum, means to support the pan with its open mouth proximate a predetermined area of the interior surface of the drum above the level of the liquid in the tank, means to discharge filter cake from the drum, stationary means in the drum to shield predetermined filtrate passages against the admission of air therethrough into the drum interior, said stationary means extending from a point ahead of the point of cake discharge to a point below the level of liquid in the tank, means to simultaneously subject all parts of the drum interior including the pan to subatmospheric pressure except that shielded by the stationary means and filtrate outlet means to determine the level of the filtrate within the drum to submerge the lower part of the stationary means, means to delivery wash liquid to said predetermined area of the drum surface proximate the open mouth of the pan, and means to deliver the spent wash liquid from the pan to a preceding predetermined area of the drum surface and sealed means to evacuate the rest of the fluid in the filter.

19. A filter comprising a rotatable drum formed with filtrate passages in its periphery, a tank within which the drum is partially submerged in liquid to be filtered, a pan within the drum, means to support the pan with its open mouth proximate a predetermined area of the interior surface of the drum, stationary means in the drum to shield predetermined filtrate passages against the admission of air therethrough into the drum interior, means to discharge filter cake from the drum surface including said predetermined filtrate passages, said stationary means extending from a point ahead of the point of cake discharge to a point below the level of liquid in the tank, barometric leg means to simultaneously subject all parts of the drum interior including the pan to subatmospheric pressure except that shielded by the stationary means and filtrate outlet means to determine the level of the filtrate within the drum to submerge the lower part of the stationary means, means to deliver wash liquid to said predetermined area of the drum surface proximate the open mouth of the pan and means to deliver the spent wash liquid from the pan to a preceding predetermined area of the drum surface, means to receive gaseous and liquid media from the barometric leg under pressure and proximate the filter and deliver the gaseous medium to the filter and evacuate the liquid from the said means to receive gaseous and liquid media while maintaining the said pressure.

20. A filter comprising a rotatable drum formed with filtrate passages in its periphery, a tank within which the drum is partially submerged in liquid to be filtered, a pan within the drum, means to support the pan with its open mouth proximate a predetermined area of the interior surface of the drum, stationary means in the drum to shield predetermined filtrate passages against the admission of air therethrough into the drum interior, means to discharge filter cake from the drum surface including said predetermined filtrate passages, said stationary means extending from a point ahead of the point of cake discharge to a point below the level of liquid in the tank, means to simultaneously subject all parts of the drum interior including the pan to subatmospheric pressure except that shielded by the stationary means, filtrate outlet means to determine the level of the filtrate within the drum to submerge the lower part of the stationary means, means communicating with the outlet means to evacuate liquid and gaseous media from the drum, means to deliver wash liquid to said predetermined area of the drum surface proximate the open mouth of the pan, means to deliver the spent wash liquid from the pan to a preceding predetermined area of the drum surface, means to seal all parts of the equipment and means to return all gaseous media to the filter.

21. A filter comprising a rotatable drum formed with filtrate passages in its periphery, a tank within which the drum is partially submerged in liquid to be filtered, a pan within the drum, means to support the pan with its open mouth proximate a predetermined area of the interior surface of the drum in a zone of washing, stationary means in the drum to shield predetermined filtrate passage against the admission of air therethrough into the drum interior, means to discharge filter cake from the drum surface including said predetermined filtrate passages, said stationary means extending from a point ahead of the point of cake discharge to a point below the level of liquid in the tank, means to simultaneously subject all parts of the drum interior including the pan to subatmospheric pressure except that shielded by the stationary means and filtrate outlet means to determine the level of the filtrate within the drum to submerge the lower part of the stationary means, means communicating with the outlet means to evacuate liquid and gaseous media from the drum, means to deliver wash liquid to said predetermined area of the drum surface proximate the open mouth of the pan, means to deliver the spent wash liquid from the pan to a preceding predetermined area of the drum surface and means to return all gaseous media to the filter.

22. In a device of the character described, in combination, a continuous filter, means to selectively deliver washing fluid to predetermined areas of filter cake adjacent the external surface of the filter, a barometric leg to create subatmospheric pressure in the filter interior, means to deliver gaseous medium under presure to a predetermined area of that surface of the filter cake adjacent the external surface of the drum to discharge the filter cake therefrom, means to seal said last mentioned predetermined area on the interior of the drum surface against subatmospheric pressure in the drum to permit discharge of the filter cake, a closed tank into which the barometric leg empties, a conduit connecting the upper portion of the closed tank with the said means to deliver gaseous medium under pressure to the filter cake, means to receive gaseous medium from the barometric leg proximate the filter and deliver the gaseous medium under pressure into the conduit proximate the filter.

FRANK W. YOUNG.